United States Patent
Miller et al.

(10) Patent No.: US 11,489,668 B2
(45) Date of Patent: *Nov. 1, 2022

(54) SECRET REGENERATION IN A STORAGE SYSTEM

(71) Applicant: Pure Storage, Inc., Mountain View, CA (US)

(72) Inventors: Ethan L. Miller, Santa Cruz, CA (US); Andrew R. Bernat, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/120,967

(22) Filed: Dec. 14, 2020

(65) Prior Publication Data

US 2021/0099298 A1    Apr. 1, 2021

Related U.S. Application Data

(63) Continuation of application No. 16/278,551, filed on Feb. 18, 2019, now Pat. No. 10,887,099, which is a
(Continued)

(51) Int. Cl.
*H04L 9/08* (2006.01)

(52) U.S. Cl.
CPC ............ *H04L 9/0891* (2013.01); *H04L 9/085* (2013.01); *H04L 9/0822* (2013.01)

(58) Field of Classification Search
CPC ...... H04L 9/0822; H04L 9/085; H04L 9/0891
See application file for complete search history.

(56) References Cited

U.S. PATENT DOCUMENTS

| 5,390,327 A | 2/1995 | Lubbers et al. |
| 5,450,581 A | 9/1995 | Bergen et al. |

(Continued)

FOREIGN PATENT DOCUMENTS

| EP | 2164006 | 3/2010 |
| EP | 2256621 | 12/2010 |

(Continued)

OTHER PUBLICATIONS

Hwang, Kai, et al. "RAID-x: A New Distributed Disk Array for I/O—Centric Cluster Computing," HPDC '00 Proceedings of the 9th IEEE International Symposium on High Performance Distributed Computing, IEEE, 2000, pp. 279-286.

(Continued)

*Primary Examiner* — Eric W Shepperd
(74) *Attorney, Agent, or Firm* — Womble Bond Dickinson (US) LLP

(57) ABSTRACT

A processor-based method for secret sharing in a computing system is provided. The method includes encrypting shares of a new secret, using a previous secret and distributing unencrypted shares of the new secret and the encrypted shares of the new secret, to members of the computing system. The method includes decrypting at least a subset of the encrypted shares of the new secret, using the previous secret and regenerating the new secret from at least a subset of a combination of the unencrypted shares of the new secret and the decrypted shares of the new secret.

20 Claims, 5 Drawing Sheets

Related U.S. Application Data continuation of application No. 15/668,529, filed on Aug. 3, 2017, now Pat. No. 10,211,983, which is a continuation of application No. 14/871,662, filed on Sep. 30, 2015, now Pat. No. 9,768,953.

(56) References Cited

U.S. PATENT DOCUMENTS

| | | |
|---|---|---|
| 5,479,653 A | 12/1995 | Jones |
| 5,488,731 A | 1/1996 | Mendelsohn |
| 5,504,858 A | 4/1996 | Ellis et al. |
| 5,564,113 A | 10/1996 | Bergen et al. |
| 5,574,882 A | 11/1996 | Menon et al. |
| 5,649,093 A | 7/1997 | Hanko et al. |
| 5,883,909 A | 3/1999 | Dekoning et al. |
| 6,000,010 A | 12/1999 | Legg |
| 6,260,156 B1 | 7/2001 | Garvin et al. |
| 6,269,453 B1 | 7/2001 | Krantz |
| 6,275,898 B1 | 8/2001 | DeKoning |
| 6,453,428 B1 | 9/2002 | Stephenson |
| 6,523,087 B2 | 2/2003 | Busser |
| 6,535,417 B2 | 3/2003 | Tsuda |
| 6,643,748 B1 | 11/2003 | Wieland |
| 6,725,392 B1 | 4/2004 | Frey et al. |
| 6,763,455 B2 | 7/2004 | Hall |
| 6,836,816 B2 | 12/2004 | Kendall |
| 6,985,995 B2 | 1/2006 | Holland et al. |
| 7,032,125 B2 | 4/2006 | Holt et al. |
| 7,047,358 B2 | 5/2006 | Lee et al. |
| 7,051,155 B2 | 5/2006 | Talagala et al. |
| 7,051,211 B1 * | 5/2006 | Matyas, Jr. ........ H04L 9/0891 705/56 |
| 7,055,058 B2 | 5/2006 | Lee et al. |
| 7,065,617 B2 | 6/2006 | Wang |
| 7,069,383 B2 | 6/2006 | Yamamoto et al. |
| 7,076,606 B2 | 7/2006 | Orsley |
| 7,107,480 B1 | 9/2006 | Moshayedi et al. |
| 7,159,150 B2 | 1/2007 | Kenchammana-Hosekote et al. |
| 7,162,575 B2 | 1/2007 | Dalal et al. |
| 7,164,608 B2 | 1/2007 | Lee |
| 7,188,270 B1 | 3/2007 | Nanda et al. |
| 7,334,156 B2 | 2/2008 | Land et al. |
| 7,370,220 B1 | 5/2008 | Nguyen et al. |
| 7,386,666 B1 | 6/2008 | Beauchamp et al. |
| 7,398,285 B2 | 7/2008 | Kisley |
| 7,424,498 B1 | 9/2008 | Patterson |
| 7,424,592 B1 | 9/2008 | Karr |
| 7,444,532 B2 | 10/2008 | Masuyama et al. |
| 7,480,658 B2 | 1/2009 | Heinla et al. |
| 7,484,056 B2 | 1/2009 | Madnani et al. |
| 7,484,057 B1 | 1/2009 | Madnani et al. |
| 7,484,059 B1 | 1/2009 | Ofer et al. |
| 7,536,506 B2 | 5/2009 | Ashmore et al. |
| 7,558,859 B2 | 7/2009 | Kasiolas |
| 7,565,446 B2 | 7/2009 | Talagala et al. |
| 7,613,947 B1 | 11/2009 | Coatney |
| 7,634,617 B2 | 12/2009 | Misra |
| 7,634,618 B2 | 12/2009 | Misra |
| 7,681,104 B1 | 3/2010 | Sim-Tang et al. |
| 7,681,105 B1 | 3/2010 | Sim-Tang et al. |
| 7,681,109 B2 | 3/2010 | Yang et al. |
| 7,730,257 B2 | 6/2010 | Franklin |
| 7,730,258 B1 | 6/2010 | Smith |
| 7,730,274 B1 | 6/2010 | Usgaonkar |
| 7,743,276 B2 | 6/2010 | Jacobsen et al. |
| 7,752,489 B2 | 7/2010 | Deenadhayalan et al. |
| 7,757,038 B2 | 7/2010 | Kitahara |
| 7,757,059 B1 | 7/2010 | Ofer et al. |
| 7,778,960 B1 | 8/2010 | Chatterjee et al. |
| 7,783,955 B2 | 8/2010 | Haratsch et al. |
| 7,814,272 B2 | 10/2010 | Barrall et al. |
| 7,814,273 B2 | 10/2010 | Barrall |
| 7,818,531 B2 | 10/2010 | Barrall |
| 7,827,351 B2 | 11/2010 | Suetsugu et al. |
| 7,827,439 B2 | 11/2010 | Matthew et al. |
| 7,831,768 B2 | 11/2010 | Ananthamurthy et al. |
| 7,856,583 B1 | 12/2010 | Smith |
| 7,860,254 B2 | 12/2010 | Soliman |
| 7,870,105 B2 | 1/2011 | Arakawa et al. |
| 7,873,878 B2 | 1/2011 | Belluomini et al. |
| 7,885,938 B1 | 2/2011 | Greene et al. |
| 7,886,111 B2 | 2/2011 | Klemm et al. |
| 7,908,448 B1 | 3/2011 | Chatterjee et al. |
| 7,916,538 B2 | 3/2011 | Jeon et al. |
| 7,921,268 B2 | 4/2011 | Jakob |
| 7,930,499 B2 | 4/2011 | Duchesne |
| 7,941,697 B2 | 5/2011 | Mathew et al. |
| 7,958,303 B2 | 6/2011 | Shuster |
| 7,971,129 B2 | 6/2011 | Watson |
| 7,984,016 B2 | 7/2011 | Kisley |
| 7,991,822 B2 | 8/2011 | Bish et al. |
| 8,006,126 B2 | 8/2011 | Deenadhayalan et al. |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,046,548 B1 | 10/2011 | Chatterjee et al. |
| 8,051,361 B2 | 11/2011 | Sim-Tang et al. |
| 8,051,362 B2 | 11/2011 | Li et al. |
| 8,074,038 B2 | 12/2011 | Lionetti et al. |
| 8,082,393 B2 | 12/2011 | Galloway et al. |
| 8,086,603 B2 | 12/2011 | Nasre et al. |
| 8,086,634 B2 | 12/2011 | Mimatsu |
| 8,086,911 B1 | 12/2011 | Taylor |
| 8,090,837 B2 | 1/2012 | Shin et al. |
| 8,108,502 B2 | 1/2012 | Tabbara et al. |
| 8,117,388 B2 | 2/2012 | Jernigan, IV |
| 8,117,521 B2 | 2/2012 | Yang et al. |
| 8,140,821 B1 | 3/2012 | Raizen et al. |
| 8,145,838 B2 | 3/2012 | Miller et al. |
| 8,145,840 B2 | 3/2012 | Koul et al. |
| 8,175,012 B2 | 5/2012 | Haratsch et at. |
| 8,176,360 B2 | 5/2012 | Frost et al. |
| 8,176,405 B2 | 5/2012 | Hafner et al. |
| 8,180,855 B2 | 5/2012 | Aiello et al. |
| 8,200,922 B2 | 6/2012 | McKean et al. |
| 8,209,469 B2 | 6/2012 | Carpenter et al. |
| 8,225,006 B1 | 7/2012 | Karamcheti |
| 8,239,618 B2 | 8/2012 | Kotzur et al. |
| 8,244,999 B1 | 8/2012 | Chatterjee et al. |
| 8,261,016 B1 | 9/2012 | Goel |
| 8,271,455 B2 | 9/2012 | Kesselman |
| 8,285,686 B2 | 10/2012 | Kesselman |
| 8,305,811 B2 | 11/2012 | Jeon |
| 8,315,999 B2 | 11/2012 | Chatley et al. |
| 8,327,080 B1 | 12/2012 | Der |
| 8,335,769 B2 | 12/2012 | Kesselman |
| 8,341,118 B2 | 12/2012 | Drobychev et al. |
| 8,351,290 B1 | 1/2013 | Huang et al. |
| 8,364,920 B1 | 1/2013 | Parkison et al. |
| 8,365,041 B2 | 1/2013 | Chu et al. |
| 8,375,146 B2 | 2/2013 | Sinclair |
| 8,397,016 B2 | 3/2013 | Talagala et al. |
| 8,402,152 B2 | 3/2013 | Duran |
| 8,412,880 B2 | 4/2013 | Leibowitz et al. |
| 8,423,739 B2 | 4/2013 | Ash et al. |
| 8,429,436 B2 | 4/2013 | Filingim et al. |
| 8,452,928 B1 | 5/2013 | Ofer et al. |
| 8,473,698 B2 | 6/2013 | Lionetti et al. |
| 8,473,778 B2 | 6/2013 | Simitci |
| 8,473,815 B2 | 6/2013 | Yu et al. |
| 8,479,037 B1 | 7/2013 | Chatterjee et al. |
| 8,484,414 B2 | 7/2013 | Sugimoto et al. |
| 8,498,967 B1 | 7/2013 | Chatterjee et al. |
| 8,522,073 B2 | 8/2013 | Cohen |
| 8,533,408 B1 | 9/2013 | Madnani et al. |
| 8,533,527 B2 | 9/2013 | Daikokuya et al. |
| 8,539,177 B1 | 9/2013 | Ofer et al. |
| 8,544,029 B2 | 9/2013 | Bakke et al. |
| 8,549,224 B1 | 10/2013 | Zeryck et al. |
| 8,583,861 B1 | 11/2013 | Ofer et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |

(56) References Cited

U.S. PATENT DOCUMENTS

| | | |
|---|---|---|
| 8,627,138 B1 | 1/2014 | Clark |
| 8,639,669 B1 | 1/2014 | Douglis et al. |
| 8,639,863 B1 | 1/2014 | Kanapathippillai et al. |
| 8,640,000 B1 | 1/2014 | Cypher |
| 8,650,343 B1 | 2/2014 | Kanapathippillai et al. |
| 8,660,131 B2 | 2/2014 | Vermunt et al. |
| 8,661,218 B1 | 2/2014 | Piszczek et al. |
| 8,671,072 B1 | 3/2014 | Shah et al. |
| 8,689,042 B1 | 4/2014 | Kanapathippillai et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey et al. |
| 8,719,621 B1 | 5/2014 | Karmarkar |
| 8,725,730 B2 | 5/2014 | Keeton et al. |
| 8,751,859 B2 | 6/2014 | Becker-szendy et al. |
| 8,756,387 B2 | 6/2014 | Frost et al. |
| 8,762,793 B2 | 6/2014 | Grube et al. |
| 8,838,541 B2 | 6/2014 | Camble et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,824,261 B1 | 9/2014 | Miller et al. |
| 8,832,528 B2 | 9/2014 | Thatcher et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes |
| 8,874,836 B1 | 10/2014 | Hayes |
| 8,880,793 B2 | 11/2014 | Nagineni |
| 8,880,825 B2 | 11/2014 | Lionetti et al. |
| 8,886,778 B2 | 11/2014 | Nedved et al. |
| 8,892,881 B2 | 11/2014 | Giuliani |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 | 4/2015 | Hayes et al. |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu |
| 9,043,372 B2 | 5/2015 | Makkar et al. |
| 9,047,214 B1 | 6/2015 | Sharon et al. |
| 9,053,808 B2 | 6/2015 | Sprouse |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon |
| 9,122,401 B2 | 9/2015 | Zaltsman et al. |
| 9,123,422 B2 | 9/2015 | Sharon et al. |
| 9,124,300 B2 | 9/2015 | Olbrich et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman et al. |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B2 | 4/2016 | Karamcheti et al. |
| 9,311,969 B2 | 4/2016 | Murin |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,396,202 B1 | 7/2016 | Drobychev et al. |
| 9,400,828 B2 | 7/2016 | Kesselman et al. |
| 9,405,478 B2 | 8/2016 | Koseki et al. |
| 9,411,685 B2 | 8/2016 | Lee |
| 9,417,960 B2 | 8/2016 | Klein |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Chamness et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,552,248 B2 | 1/2017 | Miller et al. |
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B1 | 3/2017 | Sathiamoorthy et al. |
| 9,600,193 B2 | 3/2017 | Ahrens et al. |
| 9,619,321 B1 | 4/2017 | Sharon et al. |
| 9,619,430 B2 | 4/2017 | Kannan et al. |
| 9,645,754 B2 | 5/2017 | Li et al. |
| 9,667,720 B1 | 5/2017 | Bent et al. |
| 9,710,535 B2 | 7/2017 | Aizman et al. |
| 9,733,840 B2 | 8/2017 | Karamcheti et al. |
| 9,734,225 B2 | 8/2017 | Akirav et al. |
| 9,740,403 B2 | 8/2017 | Storer et al. |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B1 | 10/2017 | Singh |
| 9,804,925 B1 | 10/2017 | Carmi et al. |

(56) References Cited

U.S. PATENT DOCUMENTS

| | | |
|---|---|---|
| 9,811,285 B1 | 11/2017 | Karamcheti et al. |
| 9,811,546 B1 | 11/2017 | Bent et al. |
| 9,818,478 B2 | 11/2017 | Chung |
| 9,829,066 B2 | 11/2017 | Thomas et al. |
| 9,836,245 B2 | 12/2017 | Hayes et al. |
| 9,891,854 B2 | 2/2018 | Munetoh et al. |
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,952,809 B2 | 2/2018 | Shah |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,959,167 B1 | 5/2018 | Donlan et al. |
| 9,965,539 B2 | 5/2018 | D'halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Litsyn et al. |
| 10,019,317 B2 | 7/2018 | Usvyatsky et al. |
| 10,031,703 B1 | 7/2018 | Natanzon et al. |
| 10,061,512 B2 | 8/2018 | Chu et al. |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Lin |
| 10,089,176 B1 | 10/2018 | Donlan et al. |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Chung et al. |
| 10,162,704 B1 | 12/2018 | Kirschner et al. |
| 10,180,875 B2 | 1/2019 | Northcott |
| 10,185,730 B2 | 1/2019 | Bestler et al. |
| 10,235,065 B1 | 3/2019 | Miller et al. |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0177894 A1 | 7/2009 | Orsini |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healy et al. |
| 2013/0151653 A1 | 6/2013 | Sawiki |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0272521 A1* | 10/2013 | Kipnis ............... H04L 9/085 380/44 |
| 2013/0339314 A1 | 12/2013 | Carpenter et al. |
| 2013/0339635 A1 | 12/2013 | Amit et al. |
| 2013/0339818 A1 | 12/2013 | Baker et al. |
| 2014/0040535 A1 | 2/2014 | Lee |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0122510 A1 | 5/2014 | Namkoong et al. |
| 2014/0136880 A1 | 5/2014 | Shankar et al. |
| 2014/0181402 A1 | 6/2014 | White |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0330785 A1 | 11/2014 | Isherwood et al. |
| 2014/0359276 A1 | 12/2014 | Resch |
| 2014/0359291 A1 | 12/2014 | Wilson |
| 2014/0372838 A1 | 12/2014 | Lou et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik |
| 2015/0134824 A1 | 5/2015 | Mickens |
| 2015/0153800 A1 | 6/2015 | Lucas et al. |
| 2015/0180714 A1 | 6/2015 | Chunn |
| 2015/0188698 A1* | 7/2015 | Tsai ............... H04L 9/0877 713/171 |
| 2015/0280959 A1 | 10/2015 | Vincent |
| 2016/0028719 A1* | 1/2016 | Kobayashi ......... H04L 9/085 713/156 |
| 2016/0246537 A1 | 2/2016 | Kim |
| 2016/0132699 A1* | 5/2016 | Miller ............... G06F 21/80 713/193 |
| 2016/0191508 A1 | 6/2016 | Bestler et al. |
| 2016/0378612 A1 | 12/2016 | Hipsh et al. |
| 2017/0091236 A1 | 3/2017 | Hayes et al. |

(56) References Cited

U.S. PATENT DOCUMENTS

| | | |
|---|---|---|
| 2017/0103092 A1 | 4/2017 | Hu et al. |
| 2017/0103094 A1 | 4/2017 | Hu et al. |
| 2017/0103098 A1 | 4/2017 | Hu et al. |
| 2017/0103116 A1 | 4/2017 | Hu et al. |
| 2017/0177236 A1 | 6/2017 | Haratsch et al. |
| 2018/0039442 A1 | 2/2018 | Shadrin et al. |
| 2018/0081958 A1 | 3/2018 | Akirav et al. |
| 2018/0101441 A1 | 4/2018 | Hyun et al. |
| 2018/0101587 A1 | 4/2018 | Anglin et al. |
| 2018/0101588 A1 | 4/2018 | Anglin et al. |
| 2018/0217756 A1 | 8/2018 | Liu et al. |
| 2018/0307560 A1 | 10/2018 | Vishnumolakala et al. |
| 2018/0321874 A1 | 11/2018 | Li et al. |
| 2019/0036703 A1 | 1/2019 | Bestler |
| 2021/0273784 A1* | 9/2021 | Gryb .................... H04L 9/0861 |

FOREIGN PATENT DOCUMENTS

| | | |
|---|---|---|
| EP | 2639997 | 9/2013 |
| WO | WO 02-13033 | 2/2002 |
| WO | WO2006069235 | 6/2006 |
| WO | WO 2008103569 | 8/2008 |
| WO | WO 2008157081 | 12/2008 |
| WO | WO2008157081 | 12/2008 |
| WO | WO2012174427 | 12/2012 |
| WO | WO2013032544 | 3/2013 |
| WO | WO 2013032825 | 7/2013 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2015/018169, dated May 15, 2015.

International Search Report and the Written Opinion of the International Searching Authority, PCT/US2015/034302, dated Sep. 11, 2015.

International Search Report and the Written Opinion of the International Searching Authority, PCT/US2015/039135, dated Sep. 18, 2015.

International Search Report and the Written Opinion of the International Searching Authority, PCT/US2015/039136, dated Sep. 23, 2015.

International Search Report, PCT/US2015/039142, dated Sep. 24, 2015.

International Search Report, PCT/US2015/034291, dated Sep. 30, 2015.

International Search Report and the Written Opinion of the International Searching Authority, PCT/US2015/039137, dated Oct. 1, 2015.

International Search Report, PCT/US2015/044370, dated Dec. 15, 2015.

International Search Report amd the Written Opinion of the International Searching Authority, PCT/US2016/031039, dated May 5, 2016.

International Search Report, PCT/US2016/014604, dated May 19, 2016.

International Search Report, PCT/US2016/014361, dated May 30, 2016.

International Search Report, PCT/US2016/014356, dated Jun. 28, 2016.

International Search Report, PCT/US2016/014357, dated Jun. 29, 2016.

International Seach Report and the Written Opinion of the International Searching Authority, PCT/US2016/016504, dated Jul. 6, 2016.

International Seach Report and the Written Opinion of the International Searching Authority, PCT/US2016/024391, dated Jul. 12, 2016.

International Seach Report and the Written Opinion of the International Searching Authority, PCT/US2016/026529, dated Jul. 19, 2016.

International Seach Report and the Written Opinion of the International Searching Authority, PCT/US2016/023485, dated Jul. 21, 2016.

International Seach Report and the Written Opinion of the International Searching Authority, PCT/US2016/033306, dated Aug. 19, 2016.

International Seach Report and the Written Opinion of the International Searching Authority, PCT/US2016/047808, dated Nov. 25, 2016.

Stalzer, Mark A., "FlashBlades: System Architecture and Applications," Proceedings of the 2nd Workshop on Architectures and Systems for Big Data, Association for Computing Machinery, New York, NY, 2012, pp. 10-14.

International Seach Report and the Written Opinion of the International Searching Authority, PCT/US2016/042147, dated Nov. 30, 2016.

\* cited by examiner

SECRET REGENERATION IN A STORAGE SYSTEM

BACKGROUND

Secret sharing splits a secret into shares (which could be termed parts or pieces of the secret), and was invented by Adi Shamir and George Blakley, independently. The secret can be regenerated, using a sufficient subset (i.e., a specific threshold minimum number of shares or up to and including all) of the shares. Depending on the scheme used for secret sharing, a mathematical operation or algorithm is applied to a sufficient number (specific to the scheme) of the shares, parts or pieces of the secret to recover the secret. Secrets can be used in computing, communication and storage systems for encrypting and decrypting data or the secrets can act as passwords, keys for locks, or features for other security functions. For example, a secret (and each of the shares, parts or pieces of the secret) can be a binary number. In a distributed system, sending shares of a secret to different members of the system protects against theft of or from, or unauthorized access to any one member (or even a few members) of the system, which would at most result in theft of a share or a few shares, but not an entire key or enough shares to regenerate a key. Periodic generation of a new key is desirable from the standpoint of providing additional protection. However, it may not be possible to write a new secret to all of the members of a distributed system, because one or more members might be unavailable at the time the shares are written. If this happens, and the system fails, it is possible that a different set of system members will be available upon reboot of the system, in which case the new secret might not be recoverable, as the required quorum of shares for regenerating the secret might not be available. A distributed system facing such a condition might start again and re-split a secret, sending shares to available system members, whereupon the above situation could recur many times or indefinitely.

It is within this context that the embodiments arise.

SUMMARY

In some embodiments, a processor-based method for secret sharing in a computing system is provided. The method includes encrypting shares of a new secret, using a previous secret and distributing unencrypted shares of the new secret and the encrypted shares of the new secret, to members of the computing system. The method includes decrypting at least a subset of the encrypted shares of the new secret, using the previous secret and regenerating the new secret from at least a subset of a combination of the unencrypted shares of the new secret and the decrypted shares of the new secret.

In some embodiments, a tangible, non-transitory, computer-readable media having instructions thereupon which, when executed by a processor, cause the processor to perform a method. The method includes encrypting, with a previous secret, shares of a new secret and distributing encrypted shares and unencrypted shares of the new secret. The method includes decrypting, with the previous secret, available encrypted shares of the new secret and reproducing the new secret from at least a subset of available unencrypted shares of the new secret and the decrypted shares of the new secret.

In some embodiments, a computing system with a shared secret is provided. The computing system includes a secret generator, configured to generate and regenerate secrets, a share splitter, configured to split a secret into a plurality of shares, an encryption/decryption unit, configured to encrypt and decrypt, and one or more processors, configured to perform actions. The actions include encrypting shares of a second secret, using a first secret and the encryption/decryption unit and sending encrypted shares and unencrypted shares of the second secret to members of the computing system. The actions include decrypting at least a subset of the encrypted shares of the second secret, using the encryption/decryption unit and the first secret and regenerating the second secret, using the secret generator and unencrypted shares and decrypted shares of the second secret.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A system and related method for resharing of a split secret are herein described. Although shown in embodiments of storage devices in a storage system, the mechanisms and techniques for resharing of a split secret are applicable to computing, communication or storage systems that use a secret for various functions or purposes, and can be used in systems that are distributed, centralized, monolithic, localized, networked, cloud-based, etc. FIGS. 1-5 show storage devices using a secret to encrypt and decrypt, or otherwise lock and unlock, a key that encrypts and decrypts data in the storage system. A new secret is generated and split, and some of the new shares are encrypted, using a previous secret. Unencrypted and encrypted shares are distributed to devices of the system. It should be noted that a share(s) may be referred to as a part(s) of a secret or piece(s) of a secret in some embodiments. To unlock (e.g., decrypt) the locked (or encrypted) key, the system gathers together available unencrypted and encrypted shares, decrypts the encrypted shares using the previous (i.e., old) secret, and uses a sufficient subset of the combination of unencrypted shares and decrypted formerly encrypted shares to regenerate the new secret. Using the new secret, the system unlocks or decrypts the locked or encrypted key, which can then be used for decrypting data in the storage system, or encrypting new data to be stored in the storage system, etc. FIG. 6 presents a method for secret sharing, which is used by the present embodiments and can also be used by other systems for other mechanisms and techniques applying secrets. The mechanism can be applied in an iterative manner, to replace an older secret with a newer secret key, e.g., on a regular or irregular basis, or on demand.

Figure 1:
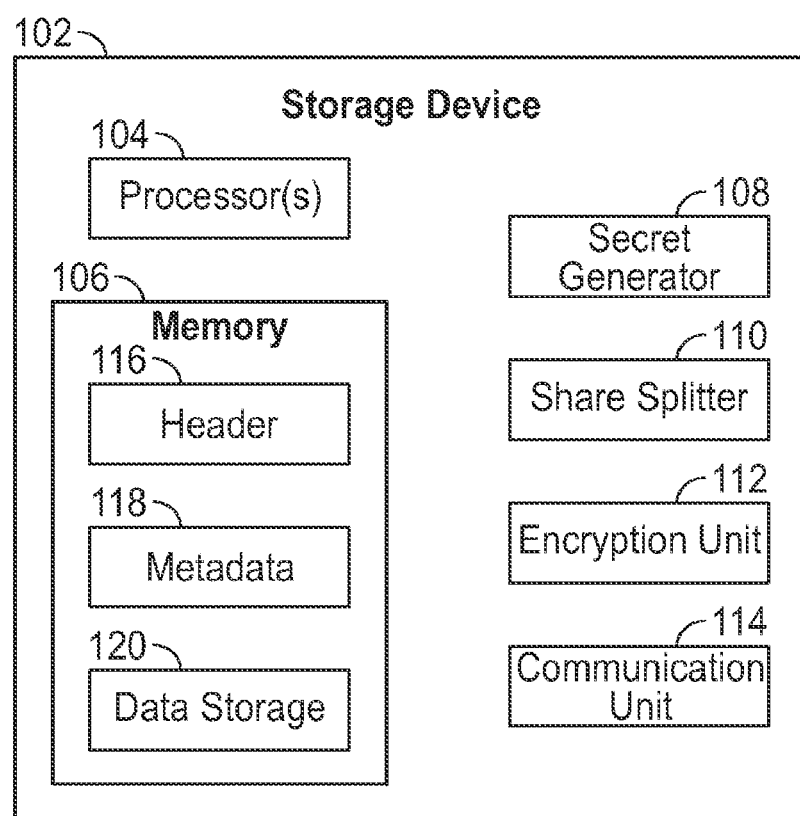
FIG. 1 is a block diagram of a storage device with facilities for sharing and resharing a split secret in accordance with some embodiments.

FIG. 1 is a block diagram of a storage device 102 with facilities for sharing and resharing a split secret. In present embodiments, the storage device 102 could be or include a storage node, a storage unit, or a storage drive, and in further embodiments could be a compute only node in a storage cluster or storage system, or other device in another system as the embodiments are not limited to storage systems and may be integrated with any computing device. The various mechanisms shown in FIG. 1 and elsewhere in the application could be implemented in software, hardware, firmware or combinations thereof and included in the storage device 102, with each storage device 102 having each of these mechanisms, or they could be separate from and coupled to the storage device 102, or shared with other storage devices 102, or various combinations thereof. One or more processors 104 could execute software and operate various mechanisms within the storage device 102. The storage device 102 has memory 106, which includes, in some embodiments, a header section 116, a metadata 118 section, and a data storage 120. A secret generator 108 can generate secrets, and regenerate secrets from shares. As noted above, a secret can be split into shares and each share may be referred to as a part of a secret or a piece of a secret in some embodiments. A share splitter 110 splits a secret into shares. Secrets, and shares, could be for example binary, octal, decimal or hexadecimal numbers, alphanumeric strings, or other combinations of bits or symbols. An encryption/decryption unit 112 encrypts and decrypts whatever needs encrypting or decrypting, such as in present embodiments data, a key, or shares of a secret. A communication unit 114 handles communication between storage devices 102 in the storage system, or to other devices in or external to the system, and could include a network port or other wired or wireless communication port. Multiple storage devices 102 are connected, e.g., via a network or bus, to form a storage system, in some embodiments.

Figure 2:
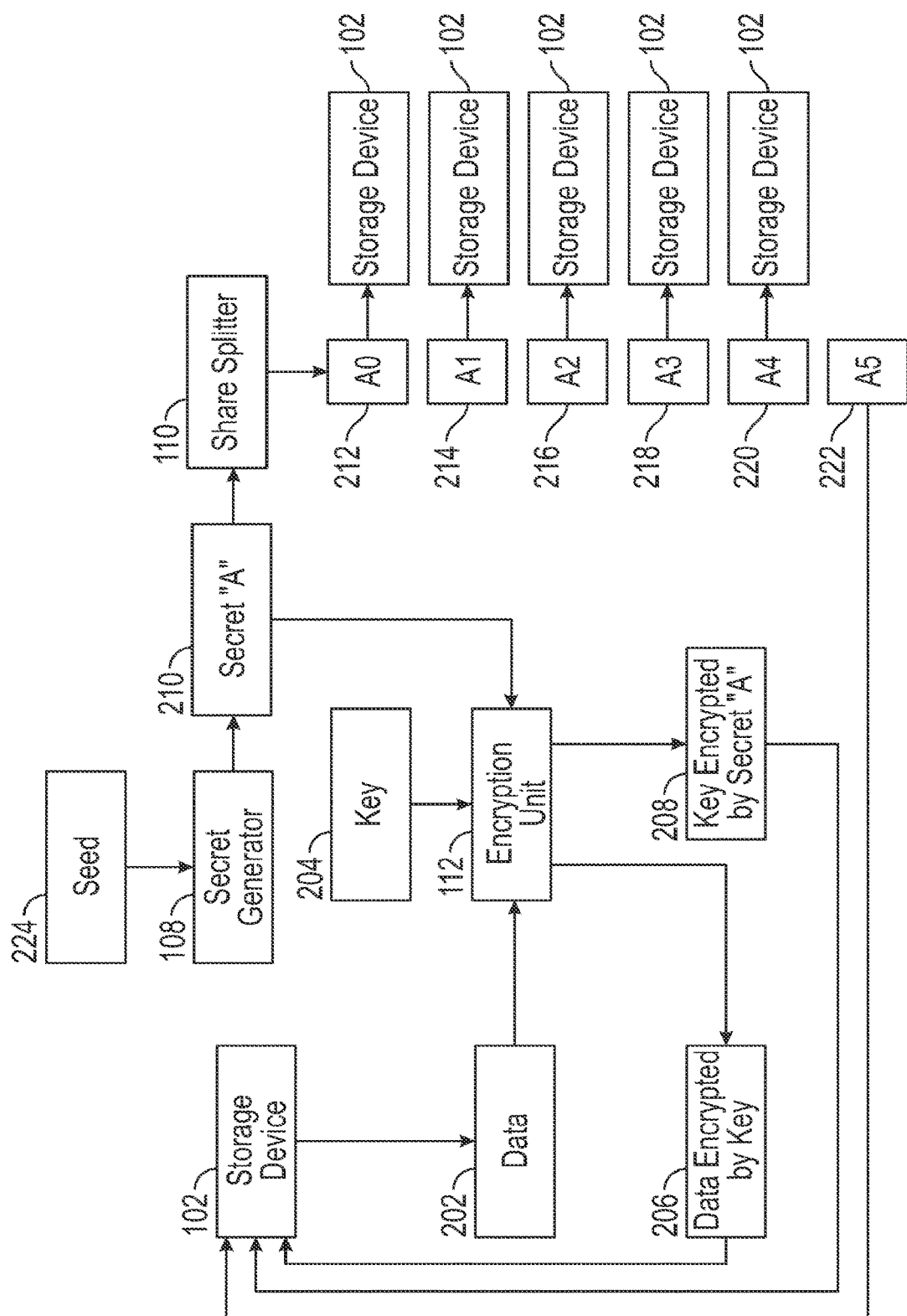
FIG. 2 is a system diagram with multiple storage devices, generating a secret "A" and shares of the secret in accordance with some embodiments.

FIG. 2 is a system diagram with multiple storage devices 102, generating a secret "A" 210 and shares of the secret. A secret generator 108, which could belong to one of the storage devices 102 or be a shared resource, generates secret "A" 210, for example as a random number from a seed 224 for an initial operation, or in an ongoing operation from a long-ago seed 224 in some embodiments. Each new secret could be independent of previous secrets, or could be based on one or more of them, e.g., as a seed 224, in various embodiments. There are many techniques for generating secrets and shares of secrets, and present embodiments are not dependent on which method or mechanism is used for generating secrets, nor should the following examples be seen as limiting as other known techniques for generating secrets and shares of secrets may be integrated with the embodiments. A key encrypting key container could be used as a secret, as could a key encrypting key plus a version number, or a data encryption key. Shares of a secret could be generated using linear interpolation in some embodiments. In other examples, shares of a secret could be generated using Reed Solomon coding, throwing away original data and keeping only the erasure coding, or shares of a secret can be generated using exclusive or (XOR) operations in some embodiments. The share splitter 110 splits the secret "A" into shares "A0" 212, "A1" 214, "A2" 216, "A3" 218, "A4" 220 and "A5" 222, each of which is sent to a storage device 102. As noted above, each of the shares 212-222 may be referred to as a part of a secret or piece of a secret. The number of shares and naming convention for shares depicted is by way of example only, and should not be considered limiting. Some embodiments of the system distribute more than one share to each storage device 102. When the system is satisfied that the shares of secret "A" 210 are all successfully distributed to storage devices 102, the system can use the secret "A" 210 to encrypt a key 204.

The (unencrypted) key 204 is used to encrypt data 202. For example, a storage device 102 could input the data 202 and the key 204 into an encryption/decryption unit 112, which then outputs data encrypted by the key 206 (i.e., data 202, as encrypted by the key 204). The storage device 102 can then store the encrypted data 206. To lock the key 204, the storage device 102 inputs the key 204 and the secret "A" 210 into the same or another encryption/decryption unit 112, which then outputs the key encrypted by the secret "A" 208 in some embodiments. As a result of these operations, the storage device now stores encrypted data and has a locked or encrypted key, and shares of the secret are distributed to storage devices 102 throughout the system. The other storage devices 102 can perform similar operations with the data those storage devices store. Thus, the system now has encrypted data, one or more locked keys 204 (which could be the same key 204 or differing keys 204 across the system), and a shared secret. Referring back to FIG. 1, each storage device 102 could store an encrypted key (e.g., a key encrypted by secret "A" 208), and one or more shares, in the header section 116 of memory 106, and store encrypted data in the data storage 120 in some embodiments.

Figure 3:
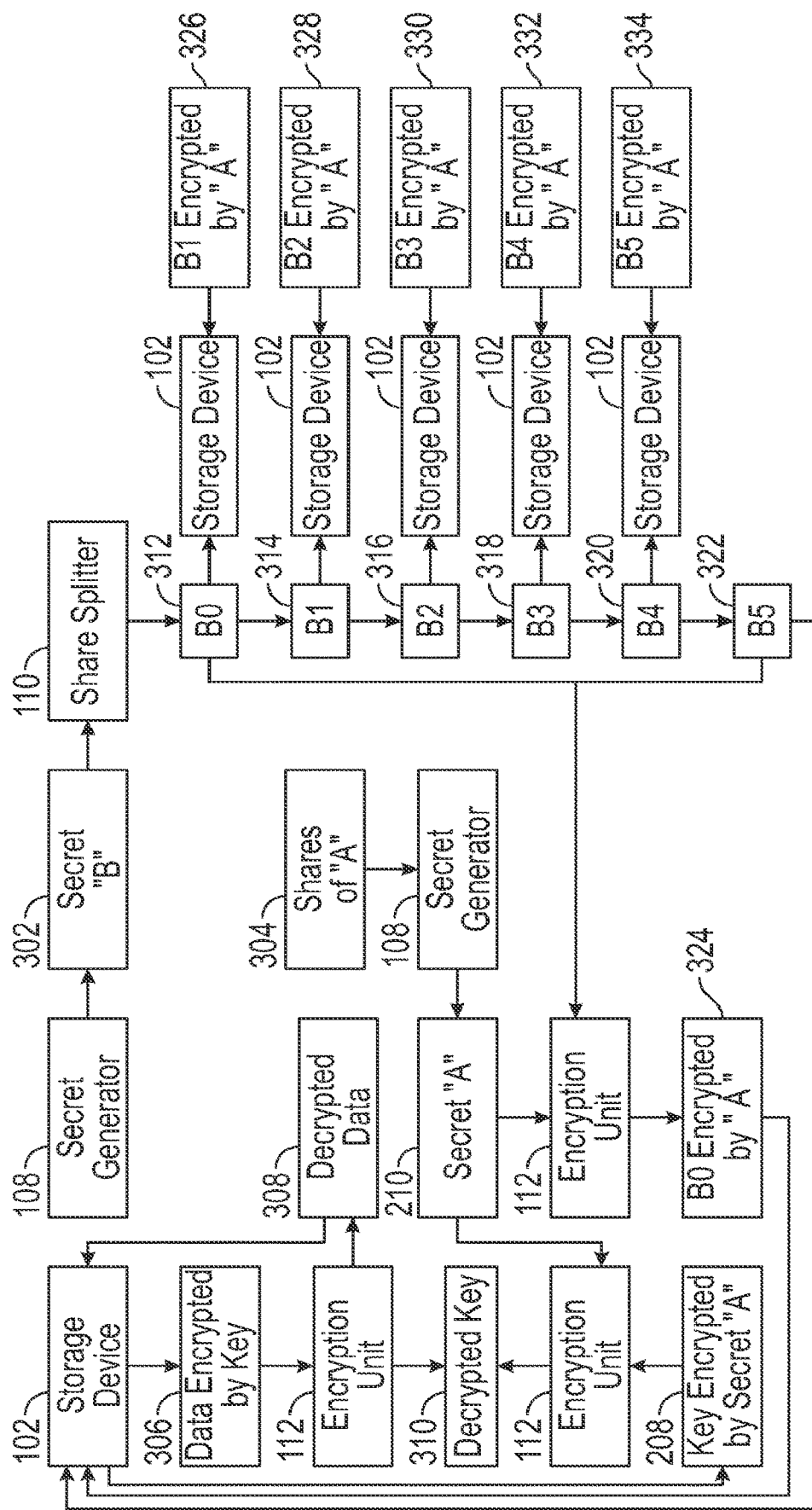
FIG. 3 is a system diagram with the storage devices generating a secret "B" and encrypting some of the shares of "B" with "A" in accordance with some embodiments.

FIG. 3 is a system diagram with the storage devices 102 generating a secret "B" 302 and encrypting some of the shares of "B" with "A". The system is able to decrypt data, and encrypt data, after unlocking or decrypting the key 204 (see FIG. 2). To recover the key 204, a storage device 102 gathers together as many shares of "A" 304 as are available (considering that some other storage devices 102 may be unresponsive, off-line, failed, or otherwise temporarily or permanently unavailable). If all of the shares of "A" 304, or at least a minimum threshold number of the shares of "A" 304 to meet the sufficient subset of shares requirement, are available, the available shares are input into the secret generator 108 which regenerates the secret "A" 210. The storage device 102 inputs the secret "A" 210 and the key encrypted by secret "A" 208 into the same or another encryption/decryption unit 112, which outputs the decrypted key 310 (i.e., the same key 204 that was originally encrypted by the secret "A" 210). The decrypted key 310 is inserted into the same or another encryption/decryption unit 112 along with the data encrypted by key 306 (e.g., the same or other data 202 that was encrypted using the key 204 in FIG. 2), and the encryption/decryption unit 112 outputs decrypted data 308, for use or storage by the storage device 102 or elsewhere within or external to the system. The storage device 102 could also use the decrypted key 310 to encrypt further data, using the process shown in FIG. 2. The system now has a mechanism to unlock or decrypt an encrypted or locked key, and use the now-decrypted or unlocked key to decrypt or encrypt data.

Still referring to FIG. 3, to transition to a new secret, the secret generator 108 generates the secret "B" 302. The share splitter 110 splits the new secret "B" 302 into shares "B0"

312, "B1" 314, "B2" 316, "B3" 318, "B4" 320, and "B5" 322. These new shares are fed into the encryption/decryption unit 112 along with the previous or old secret "A" 210, resulting in encrypted shares "B0" 324 encrypted by "A", encrypted shares "B 1" 326 encrypted by "A", encrypted shares "B2" 328 encrypted by "A", encrypted shares "B3" 330 encrypted by "A", encrypted shares "B4" 332 encrypted by "A", and encrypted shares "B5" 334 encrypted by "A". The new shares (from new secret "B" 302) and encrypted new shares are sent to the storage devices 102 in various combinations, which could be specific to system implementations. In some embodiments, each storage device 102 receives at least one unencrypted share based on the new secret "B" 302 and at least one encrypted but different share also based on the new secret "B" 302, e.g., a different share based on secret "B" 302 and encrypted by the old or previous secret "A" 210. In the example shown, one storage device 102 receives the share "B0" 312 and "B 1" 314 encrypted by "A" 326, and the other storage devices 102 each receive a corresponding share and differing encrypted share. If any one or two storage devices 102 are unavailable at any given time, sufficient shares and encrypted shares are available to make a sufficient subset of shares for recovery of the secret, as will be shown below with reference to FIG. 4.

It should be appreciated that various combinations of sets and subsets of encrypted and unencrypted shares are possible, and it is not required that the encrypted shares be encrypted from the unencrypted shares. For example, the system could generate a set of shares (e.g., from the share splitter 110), and encrypt some of the shares while leaving others of the shares unencrypted. Alternatively, the system could generate a set of shares, keep a copy of these unencrypted shares, and encrypt the same shares. In some embodiments, a combination of the above could be applied, e.g., with some shares distributed in both encrypted and unencrypted form, and other shares distributed only in encrypted form or only in unencrypted form. The total number of shares and/or the threshold number of shares required for regeneration of a secret could be set as a system dependent or situation dependent number. Two examples are provided below for illustrative purposes.

In a first example, there are seven storage devices 102, a minimum of five shares are needed to reconstruct a secret, and some of the devices are unavailable, as shown in Table 1.

TABLE 1

| storage devices | 0 | 1 | 2 | 3 | 4 | 5 | 6 |
|---|---|---|---|---|---|---|---|
| shares of secret "A" | A0 | A1 | A2 | A3 | A4 | A5 | A6 |
| unencrypted shares of secret "B" | B0 | B1 | B2 | B3 | B4 | | |
| encrypted shares of secret "B" | A(B4, B5) | A(B5, B6) | A(B0, B6) | A(B0, B1) | A(B1, B2) | | |
| storage device available for writing secret shares | yes | yes | yes | yes | yes | no | no |
| storage device available for reading, reconstructing secret | yes | yes | yes | no | no | yes | yes |

The storage devices are numbered from zero through six (see first or top row of table 1). Each of the storage devices has a share of the secret "A" (see second row of table 1). In this example the system has started distributing shares of the secret "B", but encountered some storage devices that are unavailable (see fifth or second from the bottom row of table 2). The first five shares of the secret "B" are successfully delivered to the first five storage devices (see third row of table 1). The first five storage devices have also received encrypted shares of the secret "B" (see fourth row of table 1). So, the first storage device 102 (numbered "0") has two encrypted shares of secret "B", namely the B4 share encrypted by secret "A" and the B5 share encrypted by secret "A" (shown in the table as A(B4, B5)). The next four storage devices 102 each have two more encrypted shares of secret "B". Distribution of the shares of secret "B", in unencrypted and encrypted form, is "successful" because all but two devices have received shares, and may be recovered directly by reading shares from each of the five devices 0-4. Secret "A" can be recovered from the five storage devices that are available, by obtaining the A0, A1, A2, A3 and A4 shares of "A" from the available storage devices 102 and regenerating the secret "A". In some embodiments, if a different set of storage devices is available, as shown in the bottom row of table 2, because the two storage devices that were off-line during the writing of the secret shares become online and two other storage devices go off-line, the secret "A" could be regenerated from the A0, A1, A2, A5, A6 shares. In this example, only the first three unencrypted shares of secret "B", namely B0, B1 and B2, are available. Then, using the now recovered secret "A", the system can decrypt two more shares of the secret "B" from the first storage device 102. That is, the system obtains the B4 share encrypted by secret "A" and the B5 share encrypted by secret "A", and decrypts each of these using the secret "A". Now, from the five recovered shares of secret "B", namely B0, B1, B2, B4 and B5, the system regenerates the secret "B". It should be appreciated that this example shows how a secret can be written and recovered, even though one or more storage devices are off-line during the writing of the secret, and a different one or more storage devices are off-line during the reading and recovery of the secret.

In a second example, there are again seven storage devices, a minimum of five shares are needed to reconstruct a secret, and some of the devices are unavailable during writing or reading, as shown in Table 2.

TABLE 2

| storage devices | 0 | 1 | 2 | 3 | 4 | 5 | 6 |
|---|---|---|---|---|---|---|---|
| shares of secret "A" | A0 | A1 | A2 | A3 | A4 | A5 | A6 |
| unencrypted shares of secret "B" | B0 | B1 | B2 | | | B5 | B6 |
| encrypted shares of secret "B" | A(B7) | A(B8) | A(B9) | | | A(B12) | A(B13) |
| storage device available for writing secret shares | yes | yes | yes | no | no | yes | yes |
| storage device available for reading, reconstructing secret | yes | yes | yes | yes | yes | no | no |

As in the previous example, the storage devices are numbered from zero through six (see first or top row of table 2). Each of the storage devices has a share of the secret "A" (see second row of table 2). The system has begun distributing shares of the secret "B", but some of the storage devices are unresponsive (see fifth row of table 2). The first three shares of the secret "B" are successfully delivered to the first three storage devices, and the last two shares of the secret "B" are successfully delivered to the last two storage devices (see third row of table 2). The first three and last two storage devices have also each received one encrypted share of the secret "B" (see fourth row of table 2). So, the first storage device (numbered "0") has one encrypted share of secret "B", namely the B7 share encrypted by secret "A" (shown in table 2 as A(B7)). The next two storage devices each have one more encrypted share of secret "B". Distribution of the shares of secret "B", in unencrypted and encrypted form, is incomplete, since two devices have not received their shares, but the secret "B" is still recoverable even if there were a system crash or other failure, or different storage devices were unavailable for reading. Secret "A" can be recovered if the same five storage devices are available for reading as were available for writing the secret shares, by obtaining the A0, A1, A2, A5 and A6 shares of "A" from the available storage devices (in the sixth or last row of table 2) and regenerating the secret "A". In some embodiments the system attempts to recover the secret "B", but storage devices number five and six are unavailable (see sixth or last row of table 2). In this embodiment, the system could still recover the secret "A" as described above regarding table 1. It should be appreciated that the embodiments enable multiple possibilities to recover secret "B". The system could gather five unencrypted shares of the secret "B", namely B0, B1, B2, B5 and B6, and regenerate the secret "B" from them, if the same storage devices are available for reading as were available for writing the secret shares. The system could use the recently recovered secret "A" to decrypt one or more of the available encrypted shares of secret "B", then combine with some of the unencrypted shares of the secret "B" until a sufficient number of shares of secret "B" is obtained to regenerate the secret "B". This could be accomplished with unencrypted shares B0, B2, B6 and decrypted shares B8 and B9, or unencrypted shares B1 and B5 and decrypted shares B7, B8 and B9, or other combination of sufficient number of shares of secret "B" gathered from available unencrypted and decrypted shares. If storage devices numbered five and six were off-line at the time of reconstructing the secret, as shown in the sixth or bottom row of table 2, the secret "B" could be reconstructed from the unencrypted shares B0, B1, B2 and decrypted shares B7 and B8 or B9, or some other combination of five shares. By using a combination of encrypted and unencrypted shares of a secret, distributed to storage devices in various combinations, the system can recover a secret even in cases where one or more storage devices are unavailable while the encrypted and unencrypted shares are being written to storage devices, and a different one or more storage devices are unavailable while the system reconstructs the secret. Various further scenarios of storage devices being unavailable when secret shares are being written, and the same or differing storage devices being unavailable when secret shares are being read and a secret reconstructed, are readily devised in keeping with the teachings disclosed herein.

Figure 4:
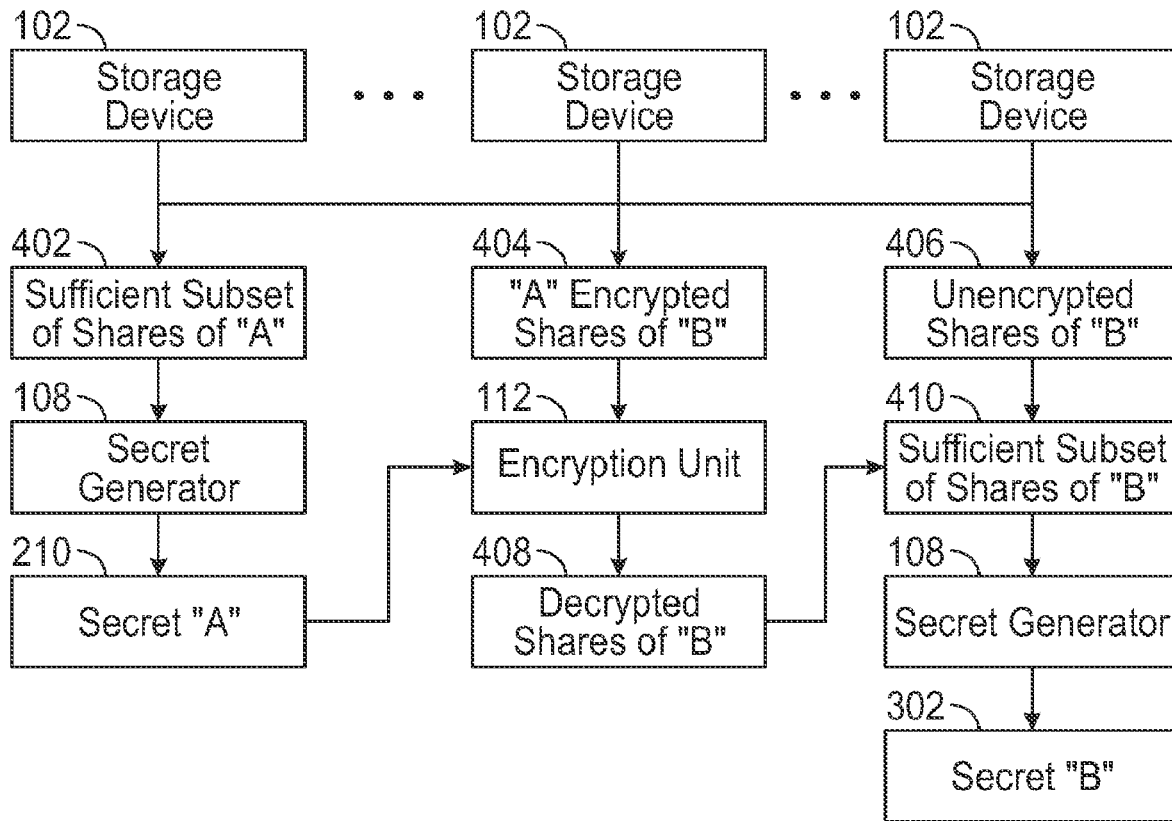
FIG. 4 is a system diagram with the storage devices regenerating the secret "A", decrypting encrypted shares of "B" and regenerating the secret "B" in accordance with some embodiments.

FIG. 4 is a system diagram with the storage devices 102 regenerating the secret "A" 210, decrypting encrypted shares of "B" and regenerating the secret "B" 302. Keeping in mind that one or more of the storage devices 102 may be unavailable or unresponsive at any given time, the system gathers together shares of the secret "A" 210, for example by having storage devices 102 communicate with each other. The system also gathers together encrypted and unencrypted shares of the secret "B" 302. If the system is able to gather together a sufficient subset of shares of "A" 402, i.e., anywhere from at least the threshold number of shares of secret "A" 210 needed to regenerate the secret "A" 210 up to and including all of the shares of "A", these shares are inserted into the secret generator 108, which regenerates the secret "A" 210. If not enough shares are available, the system can wait for a period of time and retry gathering a sufficient number of shares in some embodiments. Once the secret "A" 210 is regenerated, the secret "A" 210 and the available "A" encrypted shares of "B" 404 (i.e., shares of the secret "B" 302 as encrypted by the secret "A" 210 in FIG. 3) are input into the same or a differing encryption/decryption unit 112, which produces decrypted shares of "B" 408. If the combination of the gathered unencrypted shares of "B" 406 and the now decrypted shares of "B" 408 forms a sufficient subset of shares of "B" 410 (i.e., anywhere from at least the threshold number of shares of secret "B" 302 needed to regenerate the secret "B" 302 up to and including all of the shares of "B"), a sufficient number of these shares are input into the same or a differing secret generator 108, which outputs the regenerated secret "B" 302. If not enough shares are available, the system can wait for a period of time and retry gathering a sufficient number of shares in some embodiments.

Figure 5:
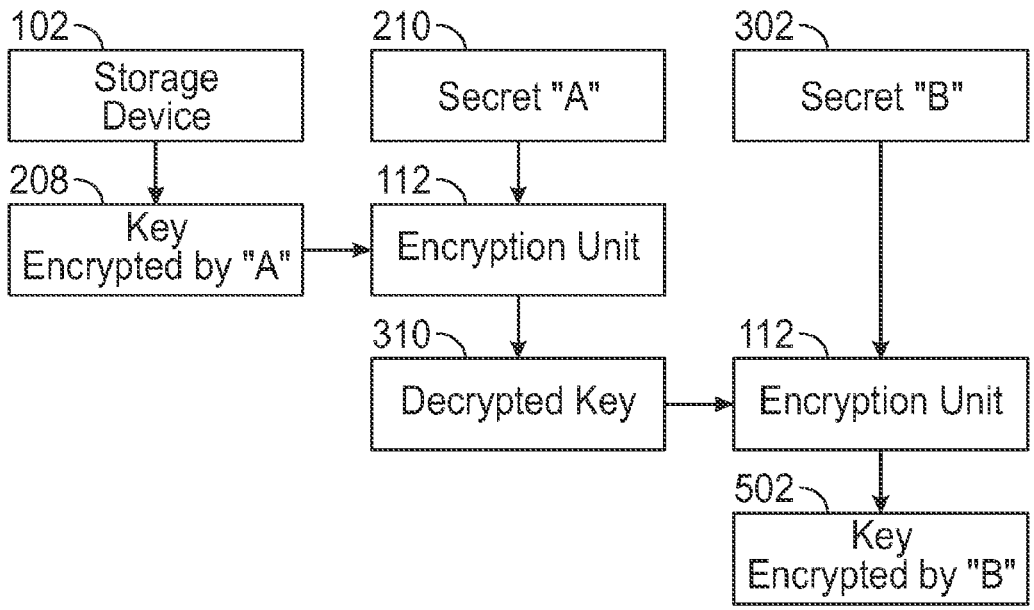
FIG. 5 is a system diagram with a storage device decrypting a key using one secret, and re-encrypting the key with another secret in accordance with some embodiments.
Figure 6:
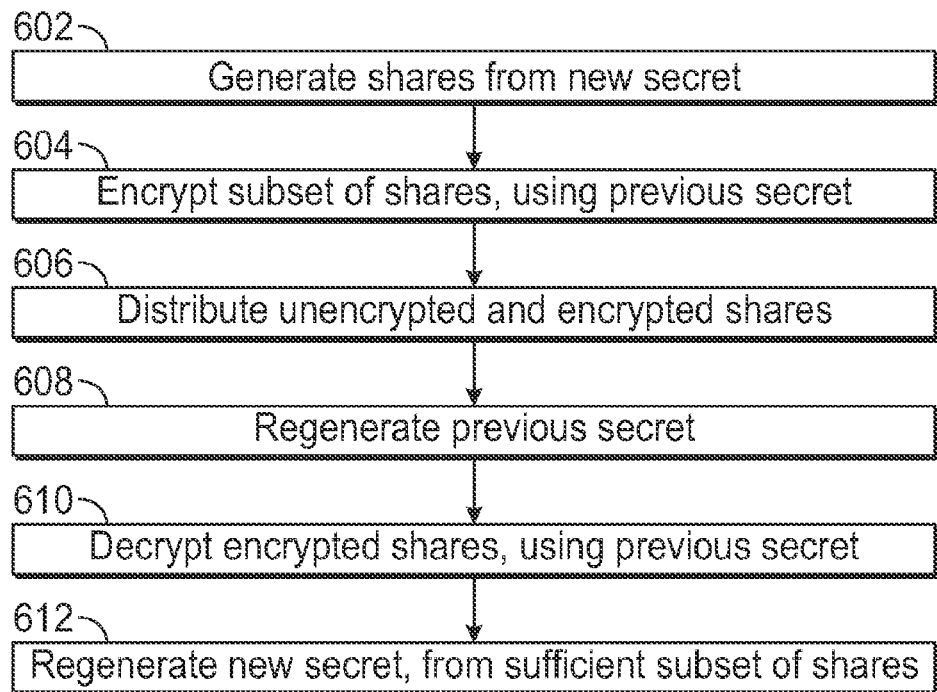
FIG. 6 is a flow diagram of a method for secret sharing, which can be practiced by one or more processors of a computing, communication or storage system in accordance with some embodiments.

FIG. 5 is a system diagram with a storage device 102 decrypting a key using one secret, and re-encrypting the key with another secret. In some embodiments, the system determines that all storage devices 102 have received their respective (unencrypted and/or encrypted) shares of the new secret, before proceeding with re-encrypting a key 204 with a new secret. This can be accomplished using polling, acknowledgment or other communication among storage devices 102 or other members of a system. To re-encrypt the key 204, e.g., the key 204 which was used to encrypt data 202 and which was encrypted with the secret "A" in FIG. 2, the storage device 102 obtains the key encrypted by secret "A" 208. The secret "A" 210 and the key encrypted by secret "A" 208 are input into the same or a differing encryption/decryption unit 112, which outputs the decrypted key 310 (i.e., the same number, or combination of bits or symbols as the original key 204). The decrypted key 310 and the secret "B" 302 are input into the same or another encryption/decryption unit 112, which outputs the key encrypted by "B" 502. This procedure can be used iteratively, to reeencrypt a key with new secrets on an ongoing basis. Once new shares are stored and verified stored, previous versions (of shares and/or encrypted keys) can be destroyed, making share rotation possible and adding security.

With reference back to FIGS. 1-5, it is readily appreciated that present embodiments of storage devices 102 in a storage system, or other computing, communication or storage systems, could apply the above mechanisms and techniques iteratively. For example, after distributing shares of secret "B" 302 in both encrypted and unencrypted form, verifying that storage devices 102 have received respective shares, and re-encrypting the key 204 with the secret "B" 302, the system can repeat these processes for a new secret "C", using the secret "B" as the previous or old secret. This process then repeats for the next new secret "D", using the secret "C" as the previous or old secret, and so on. Systems that use a secret for other mechanisms or purposes may omit or modify the data encrypting and/or key encrypting processes according to designs or circumstances in some embodiments. In some versions, off-site storage is used for some of the encrypted and/or unencrypted shares. In some embodiments, the system can use new shares to regenerate further new shares for members of the system that are missing shares (whether encrypted or unencrypted), and update those members. It should be appreciated that the mechanism discussed above is faster and more reliable than updating all of the members of the system, and prevents an attack under which an attacker always keeps multiple members out of a system to prevent resharing. In a further embodiment, a master key can unlock a system with fewer members than might otherwise be required. Some of the shares can be encrypted with a key, but the key is then stored in or external to the system. By itself, the stored key cannot unlock a system member, however, the key can unlock the shares encrypted with that key. The mechanisms and techniques described herein improve reliability, security and responsiveness of a secure system, and provide a way to reliably advance to a new secret in the face of varying availability of various devices in the system while maintaining security against theft or unauthorized access of portions of the system.

FIG. 6 is a flow diagram of a method for secret sharing, which can be practiced by one or more processors of a computing, communication or storage system. The method can be practiced on or by embodiments of the storage device as described above or any other computing device. In an action 602, shares are generated from a new secret. A subset of the shares is encrypted, using a previous secret, in an action 604. Unencrypted and encrypted shares are distributed, in an action 606. The shares that are encrypted could be the same as, or different from, some or all of the unencrypted shares, in various embodiments of the method.

To later recover the new secret, the previous secret is regenerated in an action 608. The previous secret is regenerated from a sufficient subset of shares of the previous secret. This would be a threshold number of shares of the previous secret, or all of the shares of the previous secret, or any number of shares in between these two numbers of shares. The encrypted shares of the new secret are decrypted, using the previous secret, in an action 610. In an action 612, the new secret is regenerated, from a sufficient subset of shares. This would be a threshold number of shares of the new secret, or all of the shares of the new secret, or any number of shares in between these two numbers of shares, from the combination of the gathered available unencrypted shares and the decrypted shares from the gathered available encrypted shares.

Figure 7:
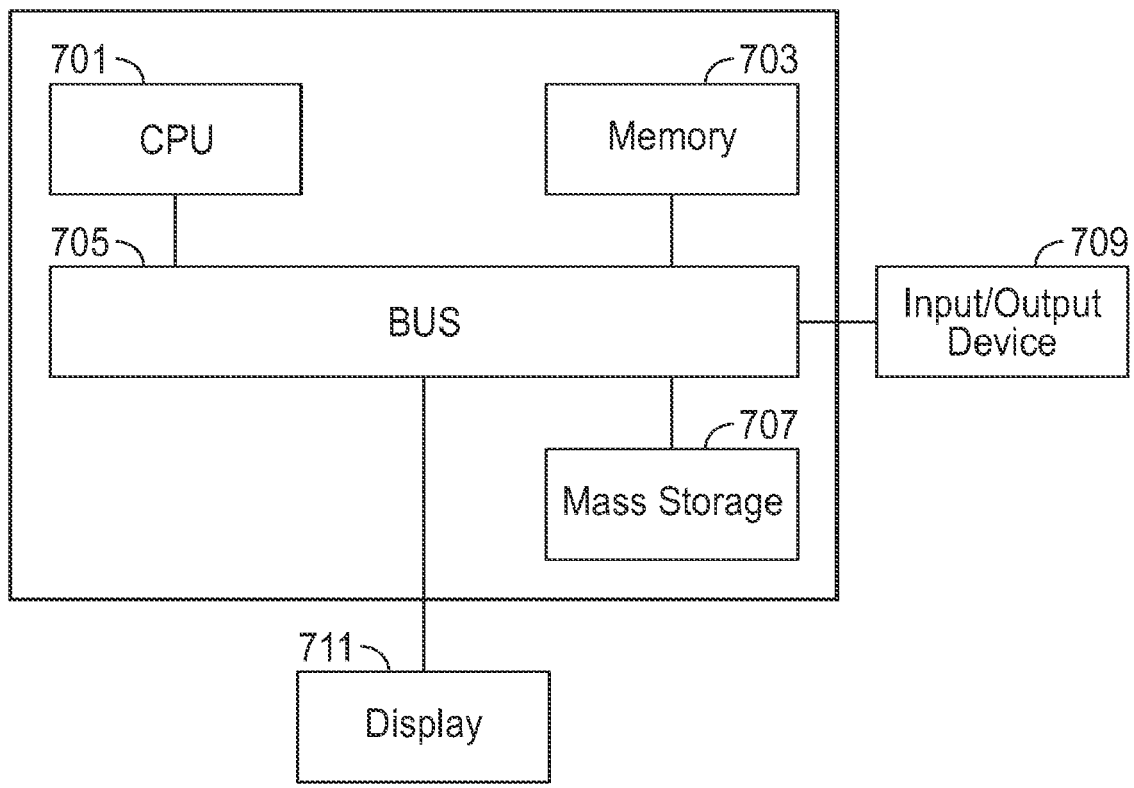
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for resharing of a split secret in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    encrypting shares of a first secret, the encrypting utilizing a second secret;
    distributing unencrypted shares of the first secret and the encrypted shares of the first secret to members of a computing system;
    decrypting at least a subset of the encrypted shares of the first secret; and
    regenerating the first secret from at least a subset of a combination of the unencrypted shares of the first secret and the decrypted shares of the first secret.

2. The method of claim 1, further comprising:
    regenerating the second secret from shares of the second secret, wherein regenerating the first secret and regenerating the second secret are responsive to a power loss.

3. The method of claim 1, further comprising:
    encrypting a key, using the first secret, in response to determining that all of the members of the computing system have received the distributed shares of the first secret.

4. The method of claim 1, further comprising:
    decrypting an encrypted data encryption key, using the first secret.

5. The method of claim 1, further comprising:
distributing at least one regenerated share of the first secret to at least one member of the computing system that does not have a share of the first secret.

6. The method of claim 1, further comprising: deleting the second secret, responsive to determining whether all of the members of the computing system have received shares of the first secret.

7. The method of claim 1, further comprising: iterating the encrypting, distributing, decrypting and regenerating for a plurality of further secrets, wherein each member of the computing system receives an unencrypted share of the first secret and an encrypted, differing share of the first secret.

8. A tangible, non-transitory, computer-readable media having instructions thereupon which, when executed by a processor, cause the processor to perform a method comprising:
encrypting shares of a first secret, the encrypting utilizing a second secret;
distributing unencrypted shares of the first secret and the encrypted shares of the first secret to members of a computing system;
decrypting at least a subset of the encrypted shares of the first secret; and
regenerating the first secret from at least a subset of a combination of the unencrypted shares of the first secret and the decrypted shares of the first secret.

9. The computer-readable media of claim 8, wherein the method further comprises:
regenerating the second secret from shares of the second secret, and wherein each member of the computing system receives an unencrypted share of the first secret and an encrypted, differing share of the first secret.

10. The computer-readable media of claim 8, wherein the method further comprises:
encrypting a key, using the first secret, in response to determining that all of the members of the computing system have received the distributed shares of the first secret.

11. The computer-readable media of claim 8, wherein the method further comprises:
decrypting an encrypted data encryption key, using the first secret.

12. The computer-readable media of claim 8, wherein the method further comprises:
distributing at least one regenerated share of the first secret to at least one member of the computing system that does not have a share of the first secret.

13. The computer-readable media of claim 8, wherein the method further comprises: deleting the second secret, responsive to determining whether all of the members of the computing system have received shares of the first secret.

14. The computer-readable media of claim 8, wherein the distributing includes sending at least one share of the first secret to off-site storage.

15. The computer-readable media of claim 8, wherein the method further comprises: iterating the encrypting, distributing, decrypting and regenerating for a plurality of further first secrets.

16. A computing system with a shared secret, comprising:
a secret generator, configured to generate and regenerate secrets;
a share splitter, configured to split a secret into a plurality of shares;
an encryption/decryption unit, configured to encrypt and decrypt; and
one or more processors, configured to perform actions comprising:
encrypting shares of a first secret, the encrypting utilizing a second secret;
distributing unencrypted shares of the first secret and the encrypted shares of the first secret to members of a computing system;
decrypting at least a subset of the encrypted shares of the first secret; and
regenerating the first secret from at least a subset of a combination of the unencrypted shares of the first secret and the decrypted shares of the first secret.

17. The computing system of claim 16, further comprising:
a memory having a header section configured to store keys and shares of secrets, and a data storage configured for storage of encrypted data, distinct from the header section.

18. The computing system of claim 16, wherein the actions further comprise:
regenerating the second secret from shares of the second secret, and wherein each member of the computing system receives an unencrypted share of the first secret and an encrypted, differing share of the first secret.

19. The computing system of claim 16, wherein the actions further comprise:
encrypting a key, using the first secret, in response to determining that all of the members of the computing system have received the distributed shares of the first secret.

20. The computing system of claim 16, wherein the actions further comprise: deleting the second secret, responsive to determining whether all of the members of the computing system have received shares of the first secret.

* * * * *